United States Patent
Li et al.

(10) Patent No.: US 12,094,085 B2
(45) Date of Patent: Sep. 17, 2024

(54) VIDEO DENOISING METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Benchao Li, Shenzhen (CN); Feng Li, Shenzhen (CN); Chenghao Liu, Shenzhen (CN); Yi Liu, Shenzhen (CN); Tong Ai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 437 days.

(21) Appl. No.: 17/572,604

(22) Filed: Jan. 10, 2022

(65) Prior Publication Data
US 2022/0130023 A1    Apr. 28, 2022

Related U.S. Application Data

(63) Continuation of application No. PCT/CN2020/095359, filed on Jun. 10, 2020.

(30) Foreign Application Priority Data

Dec. 12, 2019 (CN) .......................... 201911288617.7

(51) Int. Cl.
*G06T 5/70* (2024.01)
*G06T 5/20* (2006.01)
*G06T 5/50* (2006.01)

(52) U.S. Cl.
CPC .................. *G06T 5/20* (2013.01); *G06T 5/50* (2013.01); *G06T 5/70* (2024.01); *G06T 2207/10016* (2013.01); *G06T 2207/20221* (2013.01)

(58) Field of Classification Search
CPC .... G06T 5/20; G06T 5/50; G06T 5/70; G06T 7/254; G06T 7/277; G06T 2207/10016;
(Continued)

(56) References Cited

U.S. PATENT DOCUMENTS

2010/0309377 A1   12/2010   Schoenblum et al.
2014/0240512 A1*   8/2014   Hogasten ............. H04N 25/671
                                                                        348/164
(Continued)

FOREIGN PATENT DOCUMENTS

CN      101964863 A      2/2011
CN      102497497 A      6/2012
(Continued)

OTHER PUBLICATIONS

The State Intellectual Property Office of the People's Republic of China (SIPO) Office Action 1 for for 201911288617.7 Feb. 9, 2021 11 Pages (including translation).
(Continued)

*Primary Examiner* — Carol Wang
(74) *Attorney, Agent, or Firm* — ANOVA LAW GROUP, PLLC

(57) ABSTRACT

A video denoising method includes: performing spatial filtering on pixels of a target image in a video to be processed to obtain a first image, the spatial filtering being used for eliminating dependencies between the pixels of the target image; performing, according to a frame difference between the first image and a first denoised image, temporal filtering on the pixels of the target image in parallel to obtain a second image, the first denoised image being an denoised image that corresponds to a preceding frame of the target image; predicting first gain coefficients corresponding to pixels of the second image in a second denoised image according to second gain coefficients corresponding to the
(Continued)

pixels of the target image in the first denoised image; and fusing the first image and the second image according to the first gain coefficients to obtain the second denoised image that corresponds to the target image.

20 Claims, 11 Drawing Sheets

(58) Field of Classification Search
CPC . G06T 2207/20221; G06T 2207/20028; G06T 2207/20182; H04N 5/21; H04N 5/268; H04N 7/15; H04N 9/71; H04N 9/646
See application file for complete search history.

(56) References Cited

U.S. PATENT DOCUMENTS

| | | | | |
|---|---|---|---|---|
| 2014/0267762 | A1* | 9/2014 | Mullis | H04N 23/13 |
| | | | | 348/162 |
| 2017/0287190 | A1* | 10/2017 | Lin | G06T 5/20 |
| 2018/0220129 | A1 | 8/2018 | Peng et al. | |
| 2022/0222795 | A1* | 7/2022 | Fan | H04N 5/265 |

FOREIGN PATENT DOCUMENTS

| | | |
|---|---|---|
| CN | 102769722 A | 11/2012 |
| CN | 103369209 A | 10/2013 |
| CN | 103533214 A | 1/2014 |
| CN | 104735300 A | 6/2015 |
| CN | 107979712 A | 5/2018 |
| CN | 108174056 A | 6/2018 |
| CN | 109410124 A | 3/2019 |
| CN | 109743473 A | 5/2019 |
| CN | 110933334 A | 3/2020 |
| KR | 20100036601 A | 4/2010 |

OTHER PUBLICATIONS

The World Intellectual Property Organization (WIPO) International Search Report for PCT/CN2020/095359 Sep. 2, 2020 5 Pages (including translation).
The European Patent Office (EPO) The Extended European Search Report for 20898101.9 Jul. 29, 2022 11 pages.
Chenglin Zuo et al., "Video Denoising Based on a Spatiotemporal Kalman-Bilateral Mixture Model," The Scientific World Journal, vol. 2013, Jan. 1, 2013 (Jan. 1, 2013), pp. 1-10. 11 pages.
Ergio G Pfleger S et al., "Real-time video denoising on multicores and GPUs with Kalman-based and Bilateral filters fusion," Journal of Real-Time Image Processing, Springer, DE, vol. 16, No. 5, Feb. 8, 2017 (Feb. 8, 2017), pp. 1629-1642. 14 pages.
Anonymous: "May 25, 2010 1 Image Filtering", May 25, 2010 (May 25, 2010), Retrieved from the Internet: URL:https://www.cs.auckland.ac.nz/courses/compsci373slc/PatricesLectures/ImageFiltering_2up.pdf [retrieved on Nov. 8, 2017]. 8 pages.

* cited by examiner

Target image before denoising    Target image after denoising

VIDEO DENOISING METHOD AND APPARATUS, TERMINAL, AND STORAGE MEDIUM

CROSS-REFERENCES TO RELATED APPLICATIONS

This application is a continuation application of PCT Patent Application No. PCT/CN2020/095359, filed on Jun. 10, 2020, which claims priority to Chinese Patent Application No. 201911288617.7, entitled "VIDEO DENOISING METHOD AND APPARATUS, TERMINAL, AND STORAGE MEDIUM" filed on Dec. 12, 2019, the entire contents of both of which are incorporated herein by reference.

FIELD OF THE TECHNOLOGY

The present disclosure relates to the field of multimedia technologies, and in particular, to a video denoising method and apparatus, a terminal, and a storage medium.

BACKGROUND OF THE DISCLOSURE

With the development of multimedia technologies, collaborative office products have become an indispensable meeting tool for increasingly more medium and large enterprises. Remote video conferencing is an important part of collaborative office products, which provides great convenience for enterprises. During communication of a remote video conference, a video captured by a camera often contains a lot of noises. If these noises are not reduced, the effect of the video conference will be poor.

In the related art, in a filtering process performed on a video image, when a subsequent pixel is filtered, neighborhood pixels often include pixels that have completed the filtering process before, so that the subsequent pixel has dependency on the pixels that have been processed, and the filtering process is a serial process, which results in a slow algorithm computing speed.

SUMMARY

A video denoising method and apparatus, a terminal, and a storage medium are provided according to embodiments provided in the present disclosure.

One aspect of the present disclosure provides a video denoising method executed by a terminal. The method includes: performing spatial filtering on pixels of a target image in a video to be processed to obtain a first image, the spatial filtering being used for eliminating dependencies between the pixels of the target image; performing, according to a frame difference between the first image and a first denoised image, temporal filtering on the pixels of the target image in parallel to obtain a second image, the first denoised image being an denoised image that corresponds to a preceding frame of the target image; predicting first gain coefficients corresponding to pixels of the second image in a second denoised image according to second gain coefficients corresponding to the pixels of the target image in the first denoised image; and fusing the first image and the second image according to the first gain coefficients to obtain the second denoised image that corresponds to the target image.

Another aspect of the present disclosure provides a video denoising apparatus, including: a spatial filtering module configured to perform spatial filtering on pixels of a target image in a video to be processed to obtain a first image, the spatial filtering being used for eliminating dependencies between the pixels of the target image; a temporal filtering module configured to perform, according to a frame difference between the first image and a first denoised image, temporal filtering on the pixels of the target image in parallel to obtain a second image, the first denoised image being a denoised image that corresponds to the previous frame of the target image; and a fusing module configured to predict first gain coefficients corresponding to pixels of the second image in a second denoised image according to second gain coefficients corresponding to the pixels of the target image in the first denoised image; and fuse the first image and the second image according to the first gain coefficients to obtain the second denoised image that corresponds to the target image.

Another aspect of the present disclosure provides a non-transitory storage medium that stores computer-readable instructions. The computer-readable instructions, when executed by one or more processors, cause the one or more processors to perform: performing spatial filtering on pixels of a target image in a video to be processed to obtain a first image, the spatial filtering being used for eliminating dependencies between the pixels of the target image; performing, according to a frame difference between the first image and a first denoised image, temporal filtering on the pixels of the target image in parallel to obtain a second image, the first denoised image being an denoised image that corresponds to a preceding frame of the target image; predicting first gain coefficients corresponding to pixels of the second image in a second denoised image according to second gain coefficients corresponding to the pixels of the target image in the first denoised image; and fusing the first image and the second image according to the first gain coefficients to obtain the second denoised image that corresponds to the target image.

Another aspect of the present disclosure provides a terminal. The terminal includes a memory and a processor, computer-readable instructions being stored in the memory, and the computer-readable instructions, when executed by the processor, causing the processor to execute the operations of the video denoising method.

Details of one or more embodiments of the present disclosure are provided in the subsequent accompanying drawings and descriptions. Other features, objectives, and advantages of the present disclosure are illustrated in the specification, the accompanying drawings, and the claims.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

To make objectives, technical solutions, and advantages of the present disclosure clearer, the following further describes implementations of the present disclosure in detail with reference to the accompanying drawings.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with the present disclosure. On the contrary, the implementations are merely examples of devices and methods that are described in detail in the appended claims and that are consistent with some aspects of the present disclosure.

Figure 1:
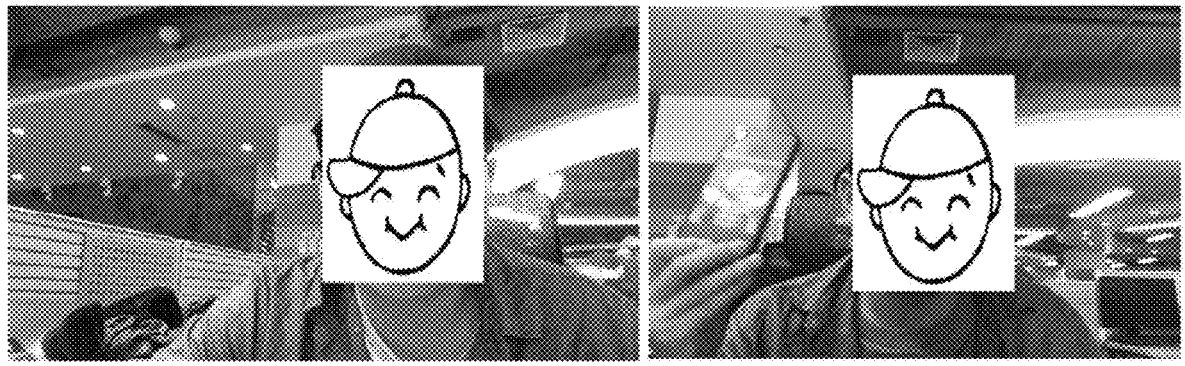
FIG. 1 is a video image captured by a low-performance camera configured in a notebook computer according to an embodiment of the present disclosure.

The embodiments of the present disclosure mainly relate to a scenario of performing denoising on a video, and take performing denoising on a remote conference video as an example for description. Remote video conferencing is an important part of various functions of collaborative office products, has very strict requirements on captured videos, and usually requires the use of high-definition cameras for video capturing. When a camera with poor performance is used for video capturing, a captured video generally has noises. If these noises are not processed, the experience of the video conference will be poor. For example, referring to FIG. 1, a video image captured by a low-performance camera configured in a notebook computer is shown. As can be seen from FIG. 1, captured video images contain a lot of noises. In addition, the embodiment of the present disclosure may also be applied to perform denoising on a video captured by a mobile phone camera during a video call, or perform denoising on a video captured by a monitoring device, etc., which is not limited in the embodiment of the present disclosure.

Figure 2:
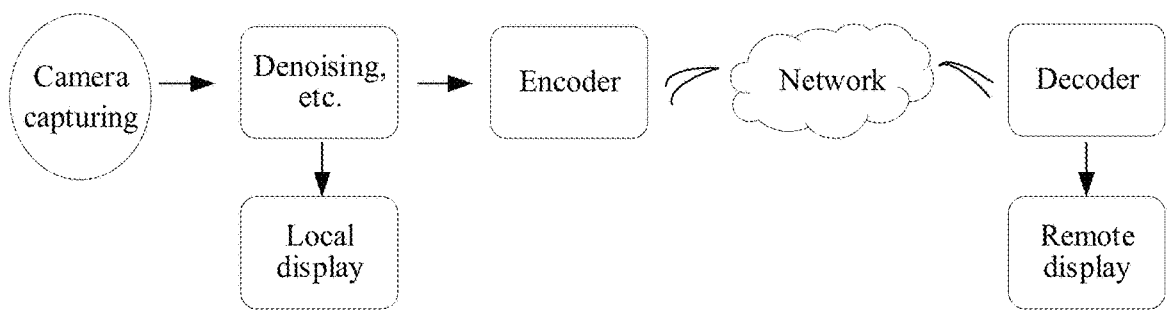
FIG. 2 is a schematic flowchart of a video conference according to an embodiment of the present disclosure.

A video denoising method according to the embodiments of the present disclosure will be described in brief below. In order to enable videos captured by cameras to meet requirements of remote video conferences, it is usually necessary to perform denoising on the captured videos. At present, there are a variety of methods for video denoising, and these methods usually implement video denoising by running a video denoising related algorithm through a central processing unit (CPU) of a terminal. The collaborative office products include not only the function of remote video conferencing, but also other functions such as process approval and project management, if the remote video conferencing function occupies most of CPU resources, other functions of the collaborative office products cannot be used normally, or the collaborative office products require high CPU processing capabilities and cannot be used in most scenarios. The video denoising method provided by the embodiments of the present disclosure removes dependency between pixels in an image to meet requirements of parallel computing. A Graphics Processing Unit (GPU) has a stronger parallel computing capability than a CPU, and therefore, the video denoising method according to the embodiments of the present disclosure replaces the CPU by calling Metal (an image processing interface provided by Apple) or DirectX (an image processing interface provided by Microsoft) provided by the GPU, for realizing the parallel processing of the pixels. Thereby, the processing speed when denoising is performed on the video is improved and the occupation of the CPU is reduced. In other words, the video denoising method provided by the embodiments of the present disclosure can achieve fast video denoising with a very low CPU occupancy rate. A video stream after denoising is then transmitted to a remote display, thus ensuring a desirable video conference experience while providing a lot of CPU resources for other functions of the collaborative office products. The foregoing process may be obtained with reference to FIG. 2, and FIG. 2 is a schematic flowchart of a video conference according to an embodiment of the present disclosure. As shown in FIG. 2, a video image captured by a camera is displayed locally after undergone denoising and other operations, for example, displayed on a screen of a notebook computer. An encoder encodes the denoised video image, and transmits it to a remote end through a network. A decoder at the remote end decodes the video image and displays the decoded video image at the remote end. The remote end may also be a notebook computer.

Figure 3:
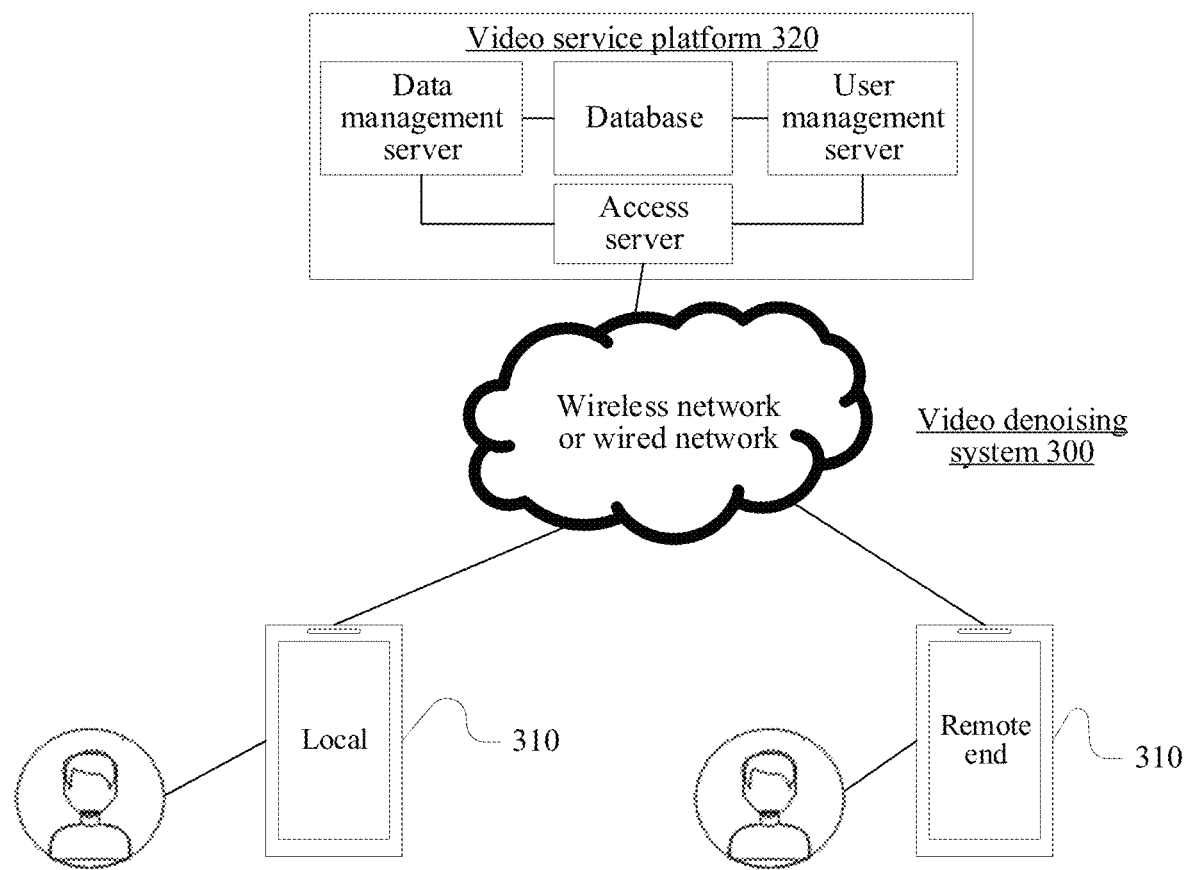
FIG. 3 is a structural block diagram of a video denoising system according to an embodiment of the present disclosure.

FIG. 3 is a structural block diagram of a video denoising system 300 according to an embodiment of the present disclosure. The video denoising system 300 may be configured to implement video denoising, and includes a terminal 310 and a video service platform 320.

The terminal 310 may be connected to the video service platform 320 through a wireless network or a wired network. The terminal 310 may be at least one of a smartphone, a video camera, a desktop computer, a tablet computer, an a Moving Picture Experts Group Audio Layer IV (MP4) player, and a laptop portable computer. An application that supports remote video conferencing is installed and run on the terminal 310. Illustratively, the terminal 310 may be a terminal used by a user, and an account of the user is logged in an application running by the terminal.

The video service platform 320 includes at least one of one server, a plurality of servers, and a cloud computing platform. The video service platform 320 is configured to provide background services for remote video conferences, such as user management and video stream forwarding. Optionally, the video service platform 320 includes: an access server, a data management server, a user management server, and a database. The access server is configured to provide an access service for the terminal 310. The data management server is configured to forward a video stream uploaded by the terminal, and the like. There may be one or a plurality of data management servers. When there are a plurality of data management servers, there are at least two data management servers for providing different services, and/or, there are at least two data management servers for providing the same service. For example, the same service is provided in a load balancing manner or the same service is provided in the manner of a main server and a mirror server, which is not limited in the embodiment of the present disclosure. The database is configured to store account information of the user. The account information is data information that has been authorized by the user for capturing.

The terminal 310 may generally refer to one of a plurality of terminals, and this embodiment only uses the local terminal 310 and two remote terminals 310 as examples. A person skilled in the art may learn that there may be more or fewer terminals. For example, there may be only one above remote terminal, or may be dozens or hundreds of above remote terminal, or more. The number and types of the terminals 310 are not limited in the embodiment of the present disclosure.

Figure 4:
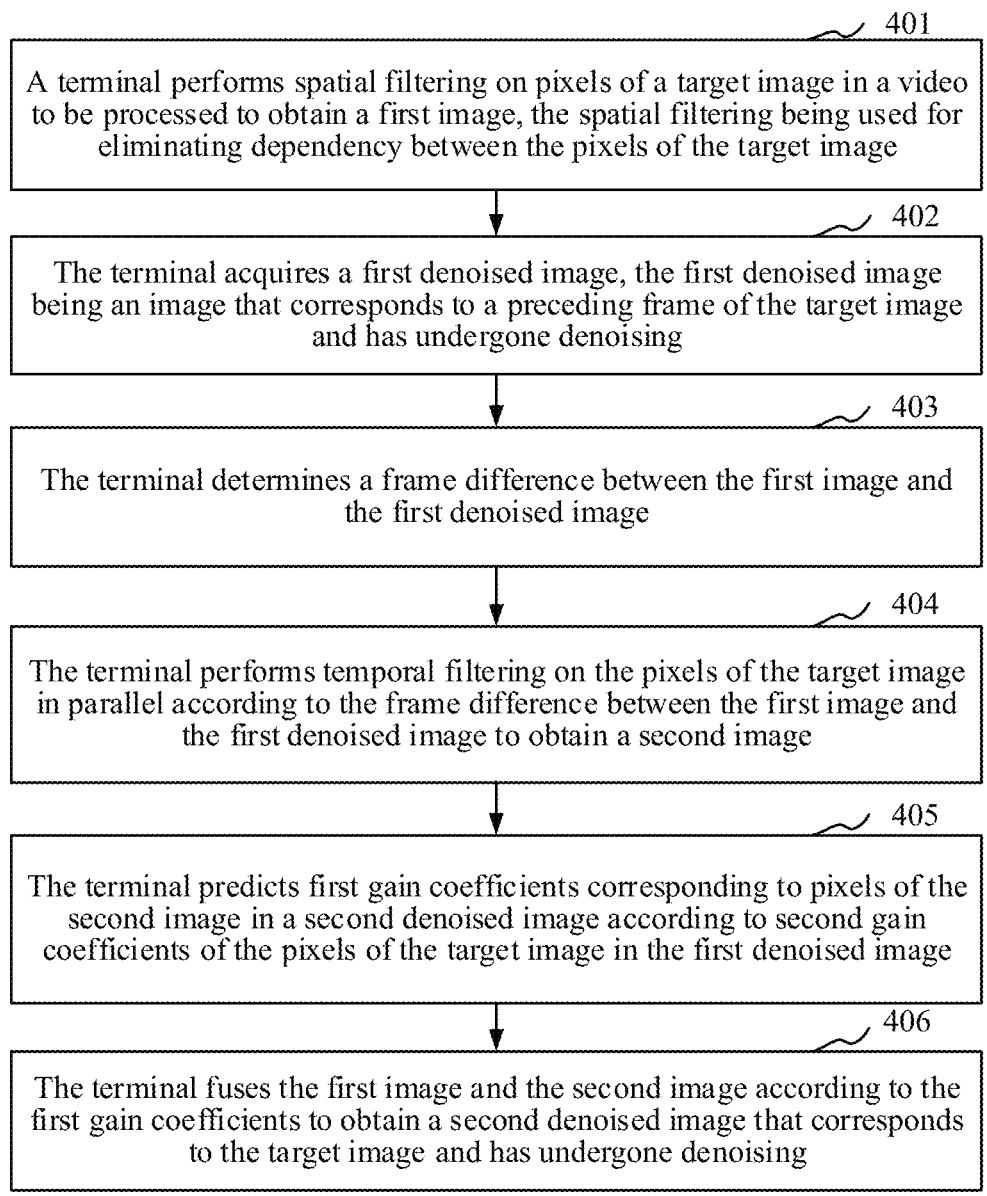
FIG. 4 is a flowchart of a video denoising method according to an embodiment of the present disclosure.

FIG. 4 is a flowchart of a video denoising method according to an embodiment of the present disclosure. As shown in FIG. 4, the method includes the following steps:

Step 401: A terminal performs spatial filtering on pixels of a target image in a video to be processed to obtain a first image, the spatial filtering being used for eliminating dependencies between the pixels of the target image.

In the embodiment of the present disclosure, the terminal may implement spatial filtering on the pixels of the target image based on a first filter, that is, input the target image into the first filter, and an output of the first filter is the first image after the spatial filtering. The first filter may be an improved bilateral filter, and the first filter can process the pixels of the target image in parallel.

The first filter is described below:

In the field of image denoising, a bilateral filtering algorithm is a non-linear edge-preserving filtering algorithm, and is a compromised processing method that combines the spatial proximity of an image and the similarity of pixel values. The bilateral filtering algorithm considers both spatial information and gray-scale similarity to achieve the purpose of edge preservation and denoising, and has the characteristics of simple, non-iterative, and partial. The edge preservation and denoising refers to replacing an original pixel value of a currently processed pixel by an average value of neighborhood pixels of the pixel. In the process of filtering an image to be processed by the bilateral filter based on the bilateral filter algorithm, for pixels of an image to be processed, the entire image is usually scanned by using a filter template first from left to right, then from top to bottom (or first from top to bottom, then from top to bottom). When spatial filtering is performed on a pixel, it is often achieved by linear or non-linear processing on neighborhood pixels of the currently processed pixel. Because in the process of filtering the image to be processed, when a pixel with a subsequent processing order is filtered, pixels in the neighborhood of the pixel often include pixels that have completed the spatial filtering process before, resulting in that the subsequent pixel has dependency on the filtered pixels, and such dependency causes the spatial filtering of the entire image to become a serial process. The removal of pixel dependency refers to elimination of the dependency between pixels.

The principle of the first filter may be seen in Formula (1) and Formula (2).

$$\tilde{I}(p) = \frac{\sum_q I(p)\omega(p, q)}{\sum_q \omega(p, q)} \quad (1)$$

$$\omega(p, q) = g_{\sigma_s}(\|p - q\|)g_{\sigma_r}(\|I(p) - I(q)\|) \quad (2)$$

where $\tilde{I}(p)$ indicates a pixel value of the currently processed pixel in the image after spatial filtering, $\tilde{I}(p)$ indicates a pixel value of the currently processed pixel in the image, $I(q)$ indicates a pixel value of a neighborhood pixel of the currently processed pixel in the image, p indicates the coordinates of the currently processed pixel in the image, q indicates the coordinates of the neighborhood pixel of the currently processed pixel in the image, $\omega(p, q)$ indicates a weight related to the position of the pixel, $g(\cdot)$ indicates a Gaussian function, and $\sigma_s$ and $\sigma_r$ indicate variances of the Gaussian function, respectively.

$I(q)$ corresponding to the neighborhood pixel sequentially before the currently processed pixel is a pixel value after the spatial filtering, and $I(q)$ corresponding to the neighborhood pixel sequentially after the currently processed pixel is an original pixel value of the currently processed pixel.

It is understandable that the neighborhood pixels of the currently processed pixel refer to the pixels within the neighborhood of the currently processed pixel. The neighborhoods of the pixel have different sizes, and the numbers of the neighborhood pixels of the pixel are different. The neighborhood of a pixel may be four neighborhoods, that is, an upper neighborhood, a lower neighborhood, a left neighborhood, and a right neighborhood. The neighborhood pixels of a pixel are four pixels adjacent to the top, bottom, left, and right of the pixel. The neighborhood of a pixel may be eight neighborhoods, that is, an upper neighborhood, an upper left neighborhood, an upper right neighborhood, a lower neighborhood, a lower left neighborhood, a lower right neighborhood, a left neighborhood, and a right neighborhood. The neighborhood pixels of the pixel are eight pixels surrounding the pixel. Of course, in other embodiments, the neighborhood of the pixel may also be selected in other ways.

Figure 5:
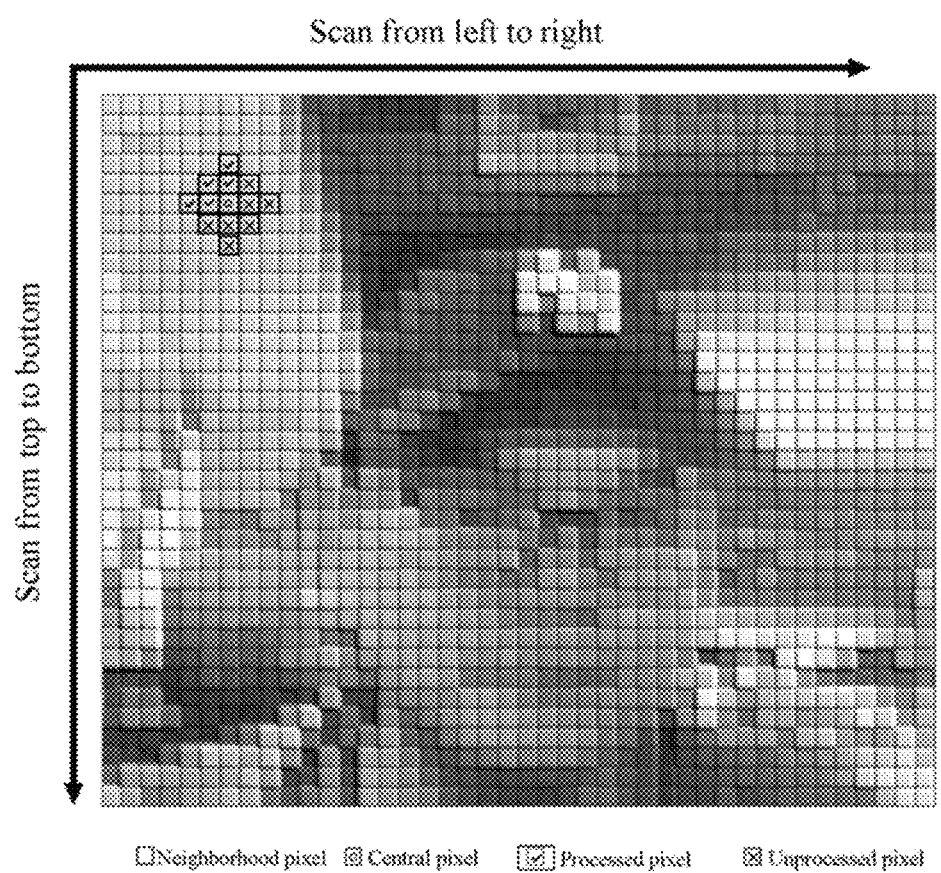
FIG. 5 is a schematic diagram of image filtering before removing pixel dependency according to an embodiment of the present disclosure.

For example, referring to FIG. 5, a schematic diagram of image filtering before pixel dependency is removed according to an embodiment of the present disclosure is shown. In FIG. 5, a currently processed pixel is a central pixel, and the central pixel corresponds to 12 neighborhood pixels. The neighborhood pixels located on the left and above the central pixel are pixels that have been processed. The neighborhood pixels located on the right and below the central pixel are unprocessed pixels.

The above spatial filtering process is a serial process, and it takes a long time compared with a parallel process. Therefore, in the embodiment of the present disclosure, a first improvement is made to the above process, that is, the above bilateral filter is improved, and the pixel dependency between pixels is removed, thus obtaining the above first filter. The first filter is also based on the bilateral filtering algorithm. The difference is that when a pixel of the target image is filtered by the above formulas (1) and (2), pixel values of the neighborhood pixels of the pixel, that is, values of $I(q)$ all use original pixel values of the image. In other words, pixel values after filtering are not used. In this way, each pixel no longer depends on the pixels whose processing orders are arranged before the current pixel, and the impact of the pixels whose processing orders are arranged before the current pixel on the current pixel after filtering is removed.

Figure 6:
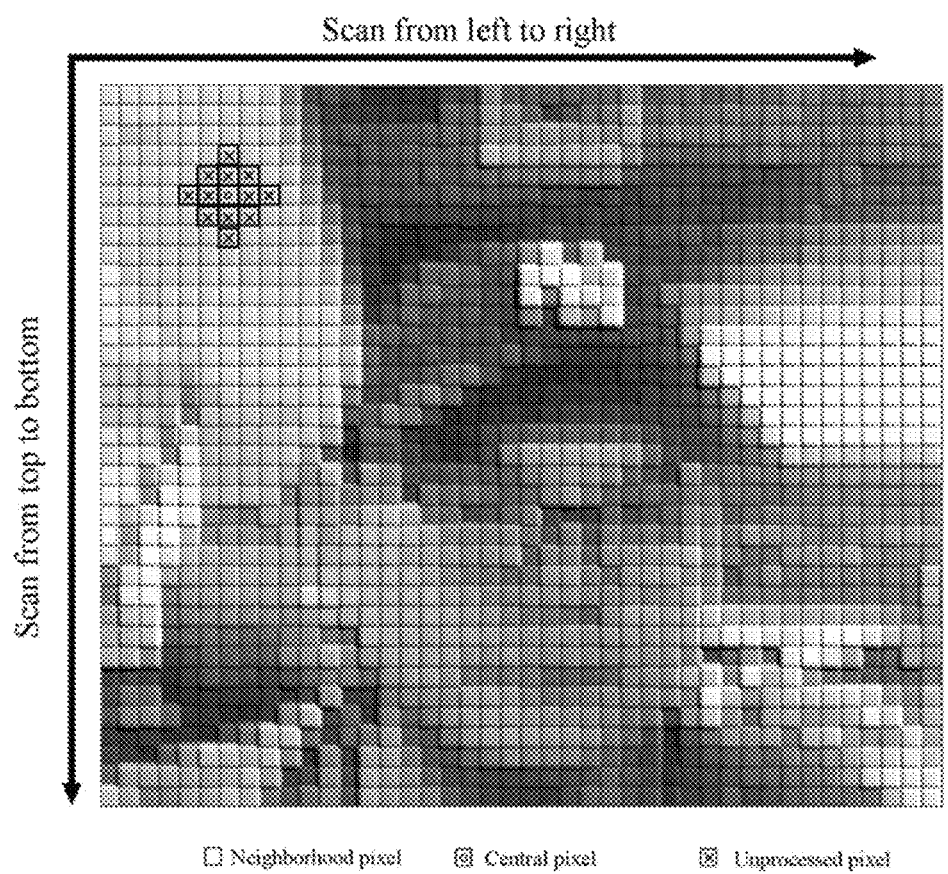
FIG. 6 is a schematic diagram of image filtering after removing pixel dependency according to an embodiment of the present disclosure.

For example, referring to FIG. 6, a schematic diagram of image filtering after pixel dependency is removed according to an embodiment of the present disclosure is shown. In FIG. 6, a currently processed pixel is a central pixel, and the central pixel corresponds to 12 neighborhood pixels. These 12 neighborhood pixels are all unprocessed pixels, that is, pixel values of the neighborhood pixels are all initial pixel values.

Figure 7:
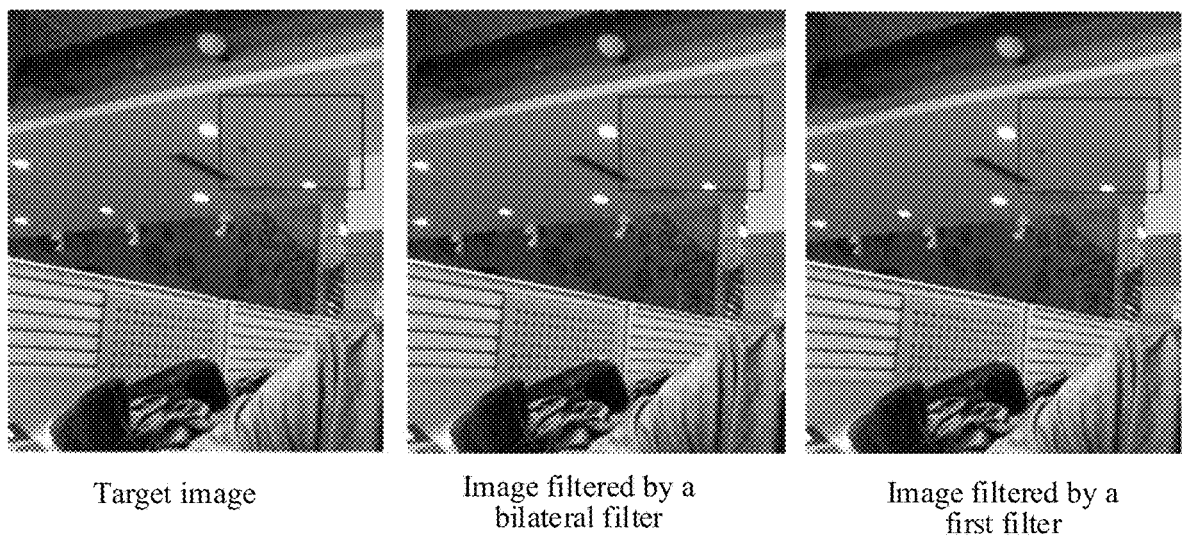
FIG. 7 is a schematic diagram of a spatial filtering effect comparison according to an embodiment of the present disclosure.

The pixel dependencies between the pixels is removed, and therefore, the process of the terminal performing spatial filtering on each pixel based on the first filter is the same. This step may be: for all pixels of the target image, the terminal may acquire initial pixel values of neighborhood pixels of each pixel. Then, the terminal may perform spatial filtering on the pixel through the first filter according to the initial pixel values of the neighborhood pixels to obtain a pixel value of the pixel after the spatial filtering. When the terminal processes all the pixels of the target image based on the first filter, a first image is obtained, and pixel values of pixels in the first image are pixel values after the spatial filtering. Referring to FIG. 7, a schematic diagram of a spatial filtering effect comparison according to an embodiment of the present disclosure is shown. FIG. 7 exemplarily shows a target image, an image filtered by a bilateral filter, and an image filtered by a first filter.

Since the parallel computing capability of the GPU is stronger than that of the CPU, in the embodiment of the present disclosure, a second improvement is made for the above process, that is, the terminal can call an image processing interface, such as Metal or DirectX, provided by the GPU to transfer the step of performing spatial filtering on pixels of a target image to the GPU for implementation.

Correspondingly, the terminal can also call the image processing interface of the graphics processing unit, acquire, through the image processing interface, pixels of the target image in a video to be processed in parallel, and perform spatial filtering on the pixels acquired in parallel, thereby implementing parallel spatial filtering on the pixels of the target image in the video to be processed, which accelerates the entire spatial filtering process, saves CPU resources, and reduces the CPU occupancy rate.

Step 402: The terminal acquires a first denoised image, the first denoised image being an image that corresponds to a preceding frame of the target image and has undergone denoising. In some embodiments, the first denoised image is an image obtained by denoising a frame immediately preceding the target image.

In the embodiment of the present disclosure, after the terminal performs spatial filtering on the pixels of the target image, it may also perform temporal filtering on the pixels of the target image. Before performing temporal filtering on the pixels of the target image, the terminal may acquire the first denoised image corresponding to the preceding frame of the target image. The subsequent step of performing temporal filtering on the target image is performed based on the first denoised image and the above first image.

Step 403: The terminal determines a frame difference between the first image and the first denoised image.

In the embodiment of the present disclosure, after acquiring the first denoised image, the terminal may store, in the form of a two-dimensional array, a denoised pixel value of each pixel of the first denoised image that has undergone denoising. Correspondingly, the terminal may also store the filtered pixel value of each pixel of the first image in the form of a two-dimensional array, and the pixels of the first image one-to-one correspond to the pixels of the first denoised image. The size of the two-dimensional array is a product of the height of the target image and the width of the image. For any pixel, the terminal may calculate a difference between the denoised pixel value of the pixel in the first denoised image and the corresponding filtered pixel value in the first image, and use the difference as a pixel frame difference corresponding to the pixel. Thus, a frame difference between the first image and the first denoised image is obtained, and the frame difference may be in the form of a two-dimensional array.

Step 404: The terminal performs temporal filtering on the pixels of the target image in parallel according to the frame difference between the first image and the first denoised image to obtain a second image.

In the embodiment of the present disclosure, after obtaining the frame difference between the first image and the first denoised image, the terminal may input the frame difference between the first image and the first denoised image and the target image into a second filter, and perform the temporal filtering based on the second filter. An output of the second filter is the second image. The second filter may be an improved Kalman filter based on a Kalman filter algorithm. That is, a third improvement in the embodiment of the present disclosure is to improve the Kalman filter based on the Kalman filter algorithm to obtain the second filter described above.

The second filter is described below:

The process of performing temporal filtering based on the Kalman filtering algorithm mainly includes two steps, one is prediction and the other is correction. During the prediction step, the terminal predicts a corresponding pixel value and variance of any pixel in the target image based on a denoised pixel value and variance of the pixel in the first denoised image. During the correction step, the terminal determines a gain coefficient corresponding to each pixel, and determines, according to the gain coefficient, a pixel value corresponding to the pixel in the target image, and a denoised pixel value corresponding to the pixel in the first denoised image, a first pixel value of the pixel after the temporal filtering. The gain coefficient is a parameter of the relationship between pixel values of responding pixels between two frames of image.

The implementation principle of the above steps may be obtained with reference to the following Formula (3) to Formula (7).

$$x_k^- = \hat{x}_{k-1} \quad (3)$$

where, $x_k^-$ indicates a pixel value of a predicted pixel in the target image, and $\hat{x}_{k-1}$ indicates a denoised pixel value corresponding to the pixel in the first denoised image.

$$P_k^- = P_{k-1} + Q \quad (4)$$

where, $P_k^-$ indicates a variance of the predicted pixel in the target image. $P_{k-1}$ Indicates a variance corresponding to the pixel in the first denoised image. Q Indicates a variance offset coefficient, which is an empirical parameter in the Kalman filter algorithm. In this embodiment, Q is a constant.

$$K_k = P_k^- (P_k^- + R)^{-1} \quad (5)$$

where, $K_k$ indicates a gain coefficient corresponding to the pixel in the predicted denoised image of the target image. R Indicates a gain offset coefficient, which is also an empirical parameter in the Kalman filter algorithm. In this embodiment, R is a parameter that changes with an iterative operation. It is understandable that both Q and R are empirical parameter factors, and Kalman filters with different performances can be obtained by adjusting them.

$$x_k = x_k^- + K_k(z_k - x_k^-) \qquad (6)$$

where, $P_k$ indicates a variance that the pixel needs to use in the next frame of image.

In order to make the algorithm operation faster, the video denoising method provided in the embodiment of the present disclosure optimizes Formula (4), and introduces a frame difference when calculating the variance, thus obtaining Formula (8).

$$P_k^- = P_{k-1} + \Delta^2 Q \qquad (8)$$

where, $\Delta$ indicates a frame difference between the first image and the first denoised image.

In order to solve the problem of motion jitter in the denoising filtering process, the video denoising method provided in the embodiment of the present disclosure adds Formula (9) and Formula (10), and optimizes Formula (5) to obtain Formula (11).

$$R_k = 1 + R_{k-1}(1 + K_{k-1})^{-1} \qquad (9)$$

where, $R_k$ indicates a gain offset coefficient corresponding to the pixel in the target image, $R_{k-1}$ indicates a gain offset coefficient corresponding to the pixel in the first denoised image, and $K_{k-1}$ indicates a gain coefficient corresponding to the pixel in the first denoised image.

$$U_k = 1 - \Delta^{\frac{1}{4}} \qquad (10)$$

where, $U_k$ indicates a motion compensation coefficient.

$$K_k = P_k^-(P_k^- + R_k U_k)^{-1} \qquad (11)$$

Correspondingly, this step can be implemented through the following sub-step 4041 to sub-step 4043. The terminal can perform temporal filtering on the pixels of the target image in parallel, in sub-step 4041 to sub-step 4044, any pixel in the target image is exemplarily taken as an example, and the processing method of another pixel is the same as that of the pixel. When all the pixels of the target image are processed by the terminal, the second image is obtained.

Step 405: The terminal predicts first gain coefficients corresponding to pixels of the second image in the second denoised image according to second gain coefficients corresponding to the pixels of the target image in the first denoised image. For details, reference can be made to sub-step 4041 to sub-step 4044.

Step 4041: The terminal determines a second variance of the pixel according to the corresponding first variance of the pixel in the first denoised image, the frame difference between the first image and the first denoised image, and a variance offset coefficient.

For example, the first variance corresponding to the pixel in the first denoised image is $P_{k-1}$, the frame difference between the first image and the first denoised image is $\Delta$, and the variance offset coefficient is Q, and the second variance $P_k^-$ of the pixel can be calculated according to the above Formula (8).

Step 4042: The terminal acquires a second gain offset coefficient and a second gain offset coefficient corresponding to the pixel in the first denoised image, and determines a first gain offset coefficient corresponding to the pixel according to the second gain coefficient and the second gain offset coefficient.

For example, the second gain coefficient corresponding to the pixel in the first denoised image is $K_{k-1}$, the second gain offset coefficient corresponding to the pixel in the first denoised image is $R_{k-1}$, and the first gain offset coefficient $R_k$ corresponding to the pixel can be calculated according to Formula (9).

Step 4043: The terminal determines a motion compensation coefficient corresponding to the pixel according to the frame difference.

For example, the frame difference is $\Delta$, and the motion compensation coefficient $U_k$ corresponding to the pixel can be calculated according to Formula (10).

Step 4044: The terminal determines the first gain coefficient corresponding to the pixel according to the second variance, the first gain offset coefficient corresponding to the pixel, and the motion compensation coefficient.

For example, according to the above Formula (11), the second variance $P_k^-$, the first gain offset coefficient $R_k$, and the motion compensation coefficient $U_k$ obtained from the above sub-steps 4041 to 4043 are calculated to obtain the first gain coefficient $K_k$ corresponding to the pixel.

After obtaining the first gain coefficient $K_k$ corresponding to the pixel, the terminal may also determine a third variance $P_k$ that the pixel needs to use in the next frame of image according to Formula (7) and the second variance $P_k^-$.

Step 406: The terminal fuses the first image and the second image according to the first gain coefficients to obtain a second denoised image that corresponds to the target image and has undergone denoising. In some embodiments, the fused image obtained from fusing the first image and the second image is used as the second denoised image.

In the embodiment of the present disclosure, the terminal also obtains the first gain coefficients corresponding to the pixels of the second image in the process of performing temporal filtering on the pixels of the target image to obtain the second image. For any pixel, the terminal may use a product of a difference between the first gain coefficient corresponding to the pixel and a preset value and a first pixel value of the pixel as a first fusion value, and use a product of the first gain coefficient corresponding to the pixel and a second pixel value of the pixel as a second fusion value. The first pixel value is a pixel value of the pixel after the temporal filtering, and the second pixel value is a pixel value of the pixel after the spatial filtering. The terminal sums the first fusion value and the second fusion value to obtain the denoised pixel value corresponding to the pixel. Correspondingly, the above summing process can be realized according to Formula (12).

$$\hat{x}_k = (1 - K_k) x_k + K_k z_k \qquad (12)$$

where, $\hat{x}_k$ indicates a denoised pixel value corresponding to the pixel.

It is understandable that, after acquiring the first gain coefficients corresponding to the pixels of the second image in the second denoised image, the terminal may use the first gain coefficients as weighting coefficients for fusing the first image and the second image. Specifically, differences between the first gain coefficients corresponding to the pixels of the second image in the second denoised image and a preset value 1 are used as fusion weights of the pixels of the second image; the first gain coefficients corresponding to the pixels of the second image in the second denoised image are used as fusion weights of the pixels of the first image, and the pixel values of the first image and the second image are weighted fused to obtain the second denoised image.

Figure 8:
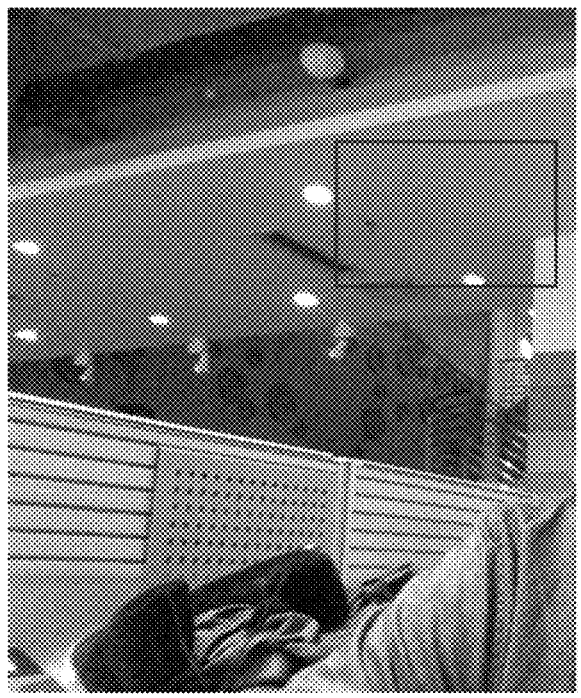
FIG. 8 is a schematic diagram of a comparison before and after denoising according to an embodiment of the present disclosure.
Figure 8:

When all the pixels are fused, the target image after denoising is obtained. For example, referring to FIG. 8, a schematic diagram of a comparison before and after denoising according to an embodiment of the present disclosure is shown. FIG. 8 includes a target image before denoising and a target image after denoising. As can be seen from the figure, the noises in the target image after denoising are significantly reduced compared to the target image before denoising, that is, the video denoising method provided in the embodiment of the application effectively realizes denoising of the target image.

The above steps 401 to 405 are optional implementations of the video denoising method provided in the embodiment of the present disclosure, and the corresponding video denoising method may not be performed in the order of the above steps 401 to 405, or alternatively, a third filter may also be set. The third filter has the same structure as the first filter. The third filter, the first filter, and the second filter can process the pixels in the target image in parallel by calling the image processing interface of the GPU, thus achieving denoising of the target image.

Figure 9:
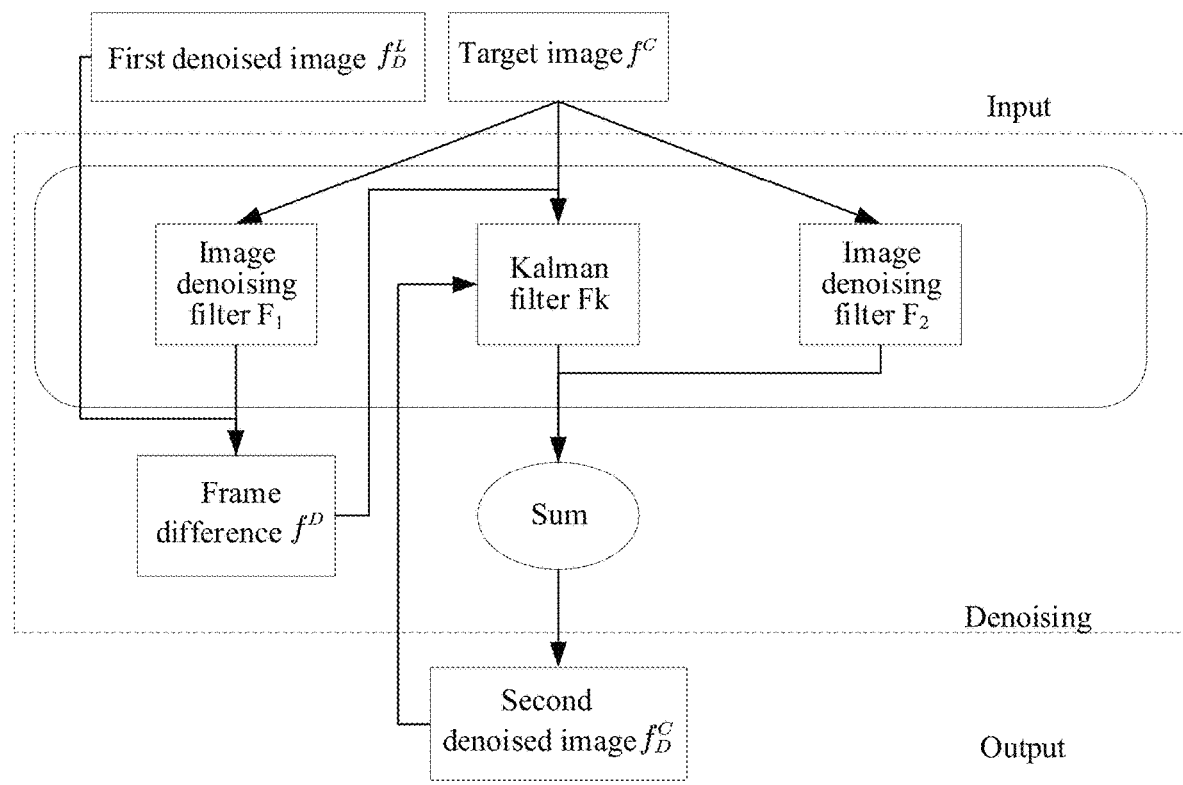
FIG. 9 is a key schematic flowchart a video denoising method according to an embodiment of the present disclosure.

For example, referring to FIG. 9, a key schematic flowchart of a video denoising method according to an embodiment of the present disclosure is shown. As shown in FIG. 9, three parts, i.e., input, denoising, and output are included in the drawing, and the input is the target image $f^C$ and the first denoised image $f_D^L$. In the denoising part, a first filter and a third filter are indicated by using image denoising filters $F_1$ and $F_2$, respectively. A second filter is indicated by a Kalman filter Fk. Parallel acceleration is performed through an image processing interface of a GPU. When a terminal performs denoising on the target image, it processes the target image $f^C$ through the image denoising filter $F_1$ to obtain a first image $f_{F_1}^C$, calculates a frame difference $f_D$ between the first denoised image $f_D^L$ and the first image $f_{F_1}^C$ according to a result of the processing, inputs the frame difference $f^D$ and the target image $f^C$ to the Kalman filter Fk, and fuses an output result of the Kalman filter Fk, i.e., the second image, and an output result of the image denoising filter $F_2$ to obtain a second denoised image $f_D^C$ that corresponds to the target image and has undergone denoising. In another embodiment, the second denoised image may also be stored in the Kalman filter to participate in subsequent image operations.

Figure 10:
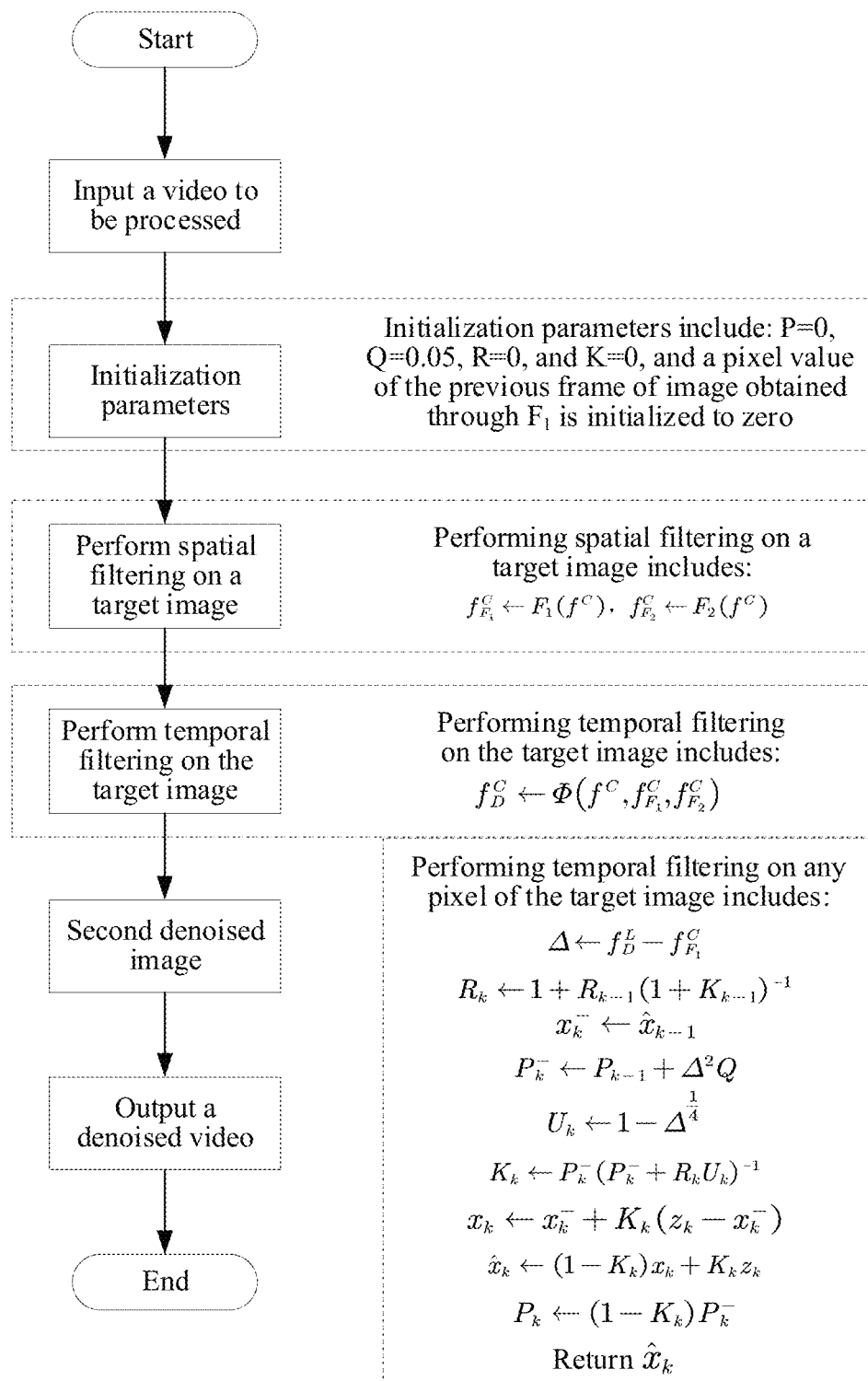
FIG. 10 is a schematic flowchart of an algorithm of a video denoising method according to an embodiment of the present disclosure.

The algorithm flow corresponding to the flow shown in FIG. 9 may be obtained with reference to that shown in FIG. 10, and FIG. 10 is a schematic diagram of an algorithm flow of a video denoising method according to an embodiment of the present disclosure. Initialization parameters include: P=0, Q=0.05, R=0, K=0, and a pixel value obtained by F1 in the previous frame of image is initialized to zero. Performing spatial filtering on the target image includes: $f_{F_1}^C \leftarrow F_1(f^C)$, $f_{F_2}^C \leftarrow F_2(f^C)$. The arrow indicates assignment. Performing temporal filtering on the target image includes: $f_D^C \leftarrow \Phi(f_C, f_{F_1}^C, f_{F_2}^C)$. Performing temporal filtering on any pixel of the target image includes: $\Delta \leftarrow f_D^L - f_{F_1}^C$ calculating the frame difference; $R_k \leftarrow 1 + R_{k-1}(1+K_{k-1})^{-1}$, calculating the gain offset coefficient; $x_k^- \leftarrow \hat{x}_{k-1}$, using the corresponding denoised pixel value in the first denoised image as a predicted pixel value of the pixel in the target image; $P_k^- \leftarrow P_{k-1}\Delta^2 Q$ calculating the second variance;

$$U_k \leftarrow 1 - \Delta^{\frac{1}{4}}$$

calculating the motion compensation coefficient; $K_k \leftarrow P_k^-(P_k^- + R_k U_k)^{-1}$ calculating the first gain coefficient; $x_k \leftarrow x_k^- + K_k(z_k - x_k^-)$, calculating the pixel value after the temporal filtering of the pixel; $\hat{x}_k \leftarrow (1-K_k)x_k + K_k z_k$ calculating the denoised pixel value; $P_k \leftarrow (1-K_k)P_k^-$ calculating the variance to be used in the next frame of image, and returning $\hat{x}_k$.

Because in the video denoising method provided by the embodiments of the present disclosure, the dependency of pixels is removed when spatial filtering is performed on the image, so that the GPU can perform parallel computing on the pixels, and when temporal filtering is performed on the image, the problem of pixel dependency does not exist either, and the GPU can also perform parallel computing on the pixels, so that the entire video denoising can be processed in parallel. When the complex denoising process is migrated to the GPU for implementation, the CPU occupancy rate of the computer will become very low. In addition, in order to further accelerate the process of denoising, the video denoising method provided in the embodiments of the present disclosure has a fourth improvement, that is, a format of an input image is set to adopt a YCbCr (YUV) format, and when denoising is performed on the image, the first filter and the second filter respectively perform spatial filtering and temporal filtering on a brightness component of the target image, that is, the denoising is performed only on the Y channel that represents the brightness detail information.

In order to more clearly demonstrate the effect of the video denoising method provided by the embodiments of the present disclosure in saving the CPU occupancy rate, the present disclosure also conducts a comparison experiment. In the comparison experiment, two notebook computers of different models are used for comparison. The comparison results can be seen in Table 1.

TABLE 1

| Model | CPU occupancy rate when decoupling and GPU parallel computing are not used | CPU occupancy rate when decoupling and GPU parallel computing are used |
| --- | --- | --- |
| Notebook computer 1 | 12.34% | 0.24% |
| Notebook computer 2 | 8.71% | 0.76% |

As can be known according to Table 1, compared with not using decoupling and GPU parallel computing, when decoupling and GPU parallel computing are used, the CPU occupancy rate drops significantly.

In the embodiment of the present disclosure, by performing the spatial filtering that removes the pixel dependency on the pixels of the target image, there is no dependencies between the pixels in the target image, and the temporal filtering is performed on the pixels of the target image in parallel according to the frame difference between the first image and the first denoised image obtained by the spatial filtering, so that the video denoising is converted from a serial process to a parallel process, and the denoising process is accelerated.

Figure 11:
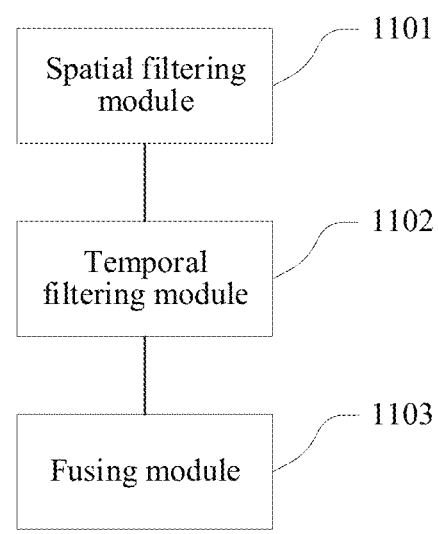
FIG. 11 is a block diagram of a video denoising apparatus according to an embodiment of the present disclosure.

FIG. 11 is a block diagram of a video denoising apparatus according to an embodiment of the present disclosure. The apparatus is configured to perform the operations when the above video denoising method is performed. Referring to FIG. 11, the apparatus includes: a spatial filtering module 1101, a temporal filtering module 1102, and a fusing module 1103. The modules included in the video denoising apparatus may be implemented in whole or in part by software, hardware, or a combination thereof.

The spatial filtering module 1101 is configured to perform spatial filtering on pixels of a target image in a video to be processed to obtain a first image, the spatial filtering being used for eliminating dependencies between the pixels of the target image.

The temporal filtering module 1102 is configured to perform, according to a frame difference between the first image and a first denoised image, temporal filtering on the pixels of the target image in parallel to obtain a second image, the first denoised image being an image that corresponds to a preceding frame of the target image and has undergone denoising.

The fusing module 1103 is configured to predict first gain coefficients corresponding to pixels of the second image in a second denoised image according to second gain coefficients corresponding to the pixels of the target image in the first denoised image; and fuse the first image and the second image according to the first gain coefficients to obtain the second denoised image that corresponds to the target image and has undergone denoising.

In one embodiment, the spatial filtering module 1101 is further configured to, for all the pixels of the target image in the video to be processed, acquire initial pixel values of neighborhood pixels of each pixel; and perform spatial filtering on the pixels according to the initial pixel values of the neighborhood pixels.

In one embodiment, the video denoising apparatus further includes: an interface calling module configured to call an image processing interface of a graphics processing unit; and a parallel acquisition module configured to acquire the pixels of the target image in the video to be processed in parallel through the image processing interface; and filter, through the image processing interface, the pixels acquired in parallel.

In one embodiment, the temporal filtering module 1102 is further configured to acquire each pixel of the target image in parallel; for any pixel of the target image, determine a second variance of the pixel according to a first variance corresponding to the pixel in the first denoised image, the frame difference between the first image and the first denoised image, and a variance offset coefficient; determine a first gain coefficient corresponding to the pixel according to the second variance, a first gain offset coefficient corresponding to the pixel, and a motion compensation coefficient; determine, according to the first gain coefficient, an initial pixel value of the pixel, and a denoised pixel value corresponding to the pixel in the first denoised image, a first pixel value of the pixel after the temporal filtering; and obtain the second image according to the first pixel value of each pixel of the target image after the temporal filtering.

In an embodiment, the video denoising apparatus further includes: a first determination module configured to determine the motion compensation coefficient according to the frame difference.

In an embodiment, the video denoising apparatus further includes: an acquisition module configured to acquire a second gain coefficient and a second gain offset coefficient corresponding to the pixel in the first denoised image; and a second determination module configured to determine the first gain offset coefficient corresponding to the pixel according to the second gain coefficient and the second gain offset coefficient.

In one embodiment, the temporal filtering module 1102 is further configured to, for any pixel of the second image, use a product of a difference between the first gain coefficient corresponding to the pixel and a preset value and the first pixel value of the pixel as a first fusion value; use a product of the first gain coefficient corresponding to the pixel and a second pixel value of the pixel as a second fusion value, the second pixel value being a pixel value of the pixel after the spatial filtering; and sum the first fusion value and the second fusion value to obtain the denoised pixel value corresponding to the pixel.

In one embodiment, the spatial filtering and the temporal filtering are respectively performed on brightness components of the pixels.

In the embodiment of the present disclosure, by performing the spatial filtering that removes the pixel dependency on the pixels of the target image, there is no dependencies between the pixels in the target image, and the temporal filtering is performed on the pixels of the target image in parallel according to the frame difference between the first image and the first denoised image obtained by the spatial filtering, so that the video denoising is converted from a serial process to a parallel process, and the denoising is accelerated.

When the apparatus provided in the above embodiment runs an application, only the division of the above functional modules is used as an example. In actual applications, the above function allocation may be completed by different functional modules as required, that is, the internal structure of the apparatus is divided into different functional modules to complete all or part of the functions described above. In addition, the apparatus provided in the above embodiment belongs to the same concept as that of the method embodiment, and a specific implementation process thereof is detailed in the method embodiment.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 12:
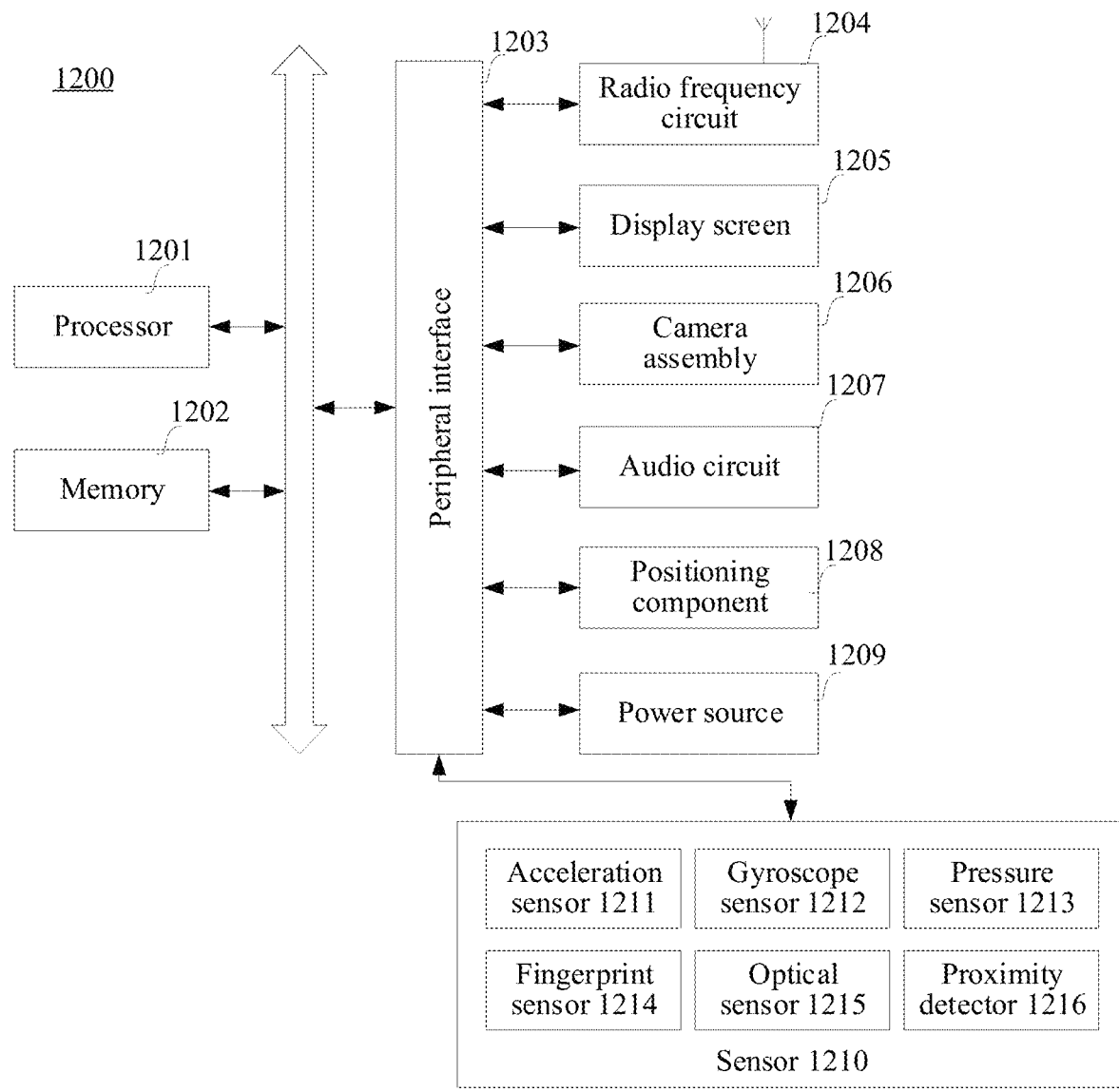
FIG. 12 is a structural block diagram of a terminal according to an embodiment of the present disclosure.

FIG. 12 is a structural block diagram of a terminal 1200 according to an embodiment of the present disclosure. The terminal 1200 may be a smartphone, a tablet computer, a Moving Picture Experts Group Audio Layer III (MP3) player, a MP4 player, a notebook computer, or a desktop computer. The terminal 1200 may also be referred to as other names such as user equipment, a portable terminal, a laptop terminal, or a desktop terminal.

Generally, the terminal 1200 includes a processor 1201 and a memory 1202.

The processor 1201 may include one or more processing cores, for example, a 4-core processor or an 8-core processor. The processor 1201 may be implemented by using at least one hardware form of a digital signal processor (DSP), a field-programmable gate array (FPGA), and a programmable logic array (PLA). The processor 1201 may alternatively include a main processor and a coprocessor. The main processor is a processor that is configured to process data in an awake state and also referred to as a CPU, and the coprocessor is a low-power processor configured to process data in an idle state. In some embodiments, the processor 1201 may be integrated with a GPU. The GPU is configured to render and draw content that needs to be displayed on a display. In some embodiments, the processor 1201 may further include an artificial intelligence (AI) processor. The AI processor is configured to process computing operations related to machine learning.

The memory 1202 may include one or more computer-readable storage media that may be non-transitory. The memory 1202 may further include a high-speed random access memory (ROM), and a non-volatile memory such as one or more magnetic disk storage devices and a flash storage device. In some embodiments, a non-transitory computer-readable storage medium in the memory 1202 is configured to store at least one instruction, the at least one instruction being configured to be executed by the processor 1201 to implement the method provided in the video denoising method embodiments of the present disclosure.

In some embodiments, the terminal 1200 may optionally include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral includes: at least one of a radio frequency (RF) circuit 1204, a touch display screen 1205, a camera assembly 1206, an audio circuit 1207, a positioning component 1208, and a power supply 1209.

The peripheral interface 1203 may be configured to connect at least one peripheral related to input/output (I/O) to the processor 1201 and the memory 1202. In some embodiments, the processor 1201, the memory 1202, and the peripheral interface 1203 are integrated on the same chip or circuit board. In some other embodiments, any one or two of the processors 1201, the memory 1202, and the peripheral interface 1203 may be implemented on an independent chip or circuit board. This is not limited in this embodiment.

The RF circuit 1204 is configured to receive and transmit an RF signal, also referred to as an electromagnetic signal. The RF circuit 1204 communicates with a communication network and another communication devices by using the electromagnetic signal. The RF circuit 1204 converts an electric signal into an electromagnetic signal for transmission, or converts a received electromagnetic signal into an electric signal. Optionally, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with another terminal by using at least one wireless communication protocol. The wireless communication protocol includes, but is not limited to: a metropolitan area network, generations of mobile communications networks (2G, 3G, 4G, and 5G), a wireless local area network and/or a wireless fidelity (Wi-Fi) network. In some embodiments, the RF 1204 may further include a circuit related to near field communication (NFC), which is not limited in the present disclosure.

The display screen 1205 is configured to display a user interface (UI). The UI may include a graph, text, an icon, a video, and any combination thereof. When the display screen 1205 is a touch display screen, the display screen 1205 is further capable of collecting touch signals on or above a surface of the display screen 1205. The touch signal may be inputted, as a control signal, to the processor 1201 for processing. In this case, the display screen 1205 may be further configured to provide a virtual button and/or a virtual keyboard, which is also referred to as a soft button and/or a soft keyboard. In some embodiments, there may be one display screen 1205 disposed on a front panel of the terminal 1200. In some other embodiments, there may be at least two display screens 1205 respectively disposed on different surfaces of the terminal 1200 or designed in a foldable shape. In still some other embodiments, the display screen 1205 may be a flexible display screen disposed on a curved surface or a folded surface of the terminal 1200. The display screen 1205 may further be set to have a non-rectangular irregular graph, that is, a special-shaped screen. The display screen 1205 may be manufactured by using a material such as a liquid crystal display (LCD), an organic light-emitting diode (OLED), or the like.

The camera assembly 1206 is configured to capture an image or a video. Optionally, the camera assembly 1206 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 1206 may further include a flash. The flash may be a single color temperature flash or a double color temperature flash. The double color temperature flash is a combination of a warm light flash and a cold light flash, and may be used for light compensation under different color temperatures.

The audio circuit 1207 may include a microphone and a speaker. The microphone is configured to acquire sound waves of users and surroundings, and convert the sound waves into electrical signals and input the signals to the processor 1201 for processing, or input the signals to the RF circuit 1204 to implement voice communication. For the purpose of stereo acquisition or noise reduction, there may be a plurality of microphones, respectively disposed at different portions of the terminal 1200. The microphone may further be an array microphone or an omni-directional acquisition type microphone. The speaker is configured to convert electric signals from the processor 1201 or the RF circuit 1204 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1207 may further include an earphone jack.

The positioning component 1208 is configured to position a current geographic location of the terminal 1200 for implementing navigation or a location-based service (LBS). The positioning component 1208 may be a positioning component based on the Global Positioning System (GPS) of the United States, the BeiDou system of China, the GLONASS System of Russia, or the GALILEO System of the European Union.

The power supply 1209 is configured to supply power to components in the terminal 1200. The power supply 1209 may be an alternating current, a direct current, a primary battery, or a rechargeable battery. When the power supply 1209 includes the rechargeable battery, the rechargeable battery may be a wired rechargeable battery or a wireless rechargeable battery. The rechargeable battery may be further configured to support a fast charge technology.

In some embodiments, the terminal 1200 may also include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect a magnitude of acceleration on three coordinate axes of a coordinate system established with the terminal 1200. For example, the acceleration sensor 1211 may be configured to detect components of gravity acceleration on the three coordinate axes. The processor 1201 may control, according to a gravity acceleration signal collected by the acceleration sensor 1211, the display screen 1205 to display the UI in a landscape view or a portrait view. The acceleration sensor 1211 may be further configured to acquire motion data of a game or a user.

The gyroscope sensor 1212 may detect a body direction and a rotation angle of the terminal 1200. The gyroscope sensor 1212 may work with the acceleration sensor 1211 to acquire a 3D action performed by the user on the terminal 1200. The processor 1201 may implement the following functions according to the data acquired by the gyroscope sensor 1212: motion sensing (such as changing the UI according to a tilt operation of the user), image stabilization at shooting, game control, and inertial navigation.

The pressure sensor 1213 may be disposed at a side frame of the terminal 1200 and/or a lower layer of the display screen 1205. When the pressure sensor 1213 is disposed at the side frame of the terminal 1200, a holding signal of the user on the terminal 1200 may be detected. The processor 1201 performs left and right hand recognition or a quick operation according to the holding signal acquired by the pressure sensor 1213. When the pressure sensor 1213 is disposed on the low layer of the display screen 1205, the processor 1201 controls, according to a pressure operation of the user on the display screen 1205, an operable control on the UI. The operable control includes at least one of a button control, a scroll-bar control, an icon control, and a menu control.

The fingerprint sensor 1214 is configured to collect a fingerprint of a user. The processor 1201 identifies an identity of the user according to the fingerprint collected by the fingerprint sensor 1214, or the fingerprint sensor 1214 identifies an identity of the user according to the collected fingerprint. When identifying that the identity of the user is a trusted identity, the processor 1201 authorizes the user to perform related sensitive operations. The sensitive operations include: unlocking a screen, viewing encrypted information, downloading software, paying, changing a setting, and the like. The fingerprint sensor 1214 may be disposed on a front surface, a back surface, or a side surface of the terminal 1200. When a physical button or a vendor logo is disposed on the terminal 1200, the fingerprint sensor 1214 may be integrated with the physical button or the vendor logo.

The optical sensor 1215 is configured to acquire ambient light intensity. In an embodiment, the processor 1201 may control display luminance of the display screen 1205 according to the ambient light intensity collected by the optical sensor 1215. Specifically, when the ambient light intensity is relatively high, the display luminance of the display screen 1205 is increased, and when the ambient light intensity is relatively low, the display luminance of the touch display screen 1205 is reduced. In another embodiment, the processor 1201 may further dynamically adjust a camera parameter of the camera assembly 1206 according to the ambient light intensity acquired by the optical sensor 1215.

The proximity sensor 1216, also referred to as a distance sensor, is usually disposed on a front panel of the terminal 1200. The proximity sensor 1216 is configured to collect a distance between a user and the front surface of the terminal 1200. In an embodiment, when the proximity sensor 1216 detects that the distance between the user and the front surface of the terminal 1200 gradually becomes smaller, the display screen 1205 is controlled by the processor 1201 to switch from a screen-on state to a screen-off state. When the proximity sensor 1216 detects that the distance between the user and the front surface of the terminal 1200 gradually becomes larger, the display screen 1205 is controlled by the processor 1201 to switch from the screen-off state to the screen-on state.

A person skilled in the art may understand that the structure shown in FIG. 12 does not constitute a limitation on the terminal 1200, and the terminal may include more components or fewer components than those shown in the figure, or some components may be combined, or a different component deployment may be used.

An embodiment of the present disclosure further provides a computer-readable storage medium, storing computer-readable instructions, and the computer-readable instructions, when being executed by the processor, causing a processor to perform the steps in the foregoing video denoising method. The steps of the video denoising method here may be the steps of the video denoising methods in the above embodiments.

A person of ordinary skill in the art may understand that all or some procedures in the methods in the foregoing embodiments may be implemented by a computer-readable instruction instructing relevant hardware. The program may be stored in a non-volatile computer-readable storage medium. When the program is executed, the procedures of the foregoing method embodiments may be implemented. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a RAM or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR-SDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be combined in different manners. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the present disclosure is subject to the protection scope of the appended claims.

What is claimed is:

1. A video denoising method, executed by a terminal, the method comprising:

performing spatial filtering on pixels of a target image in a video to be processed to obtain a first image, the spatial filtering being used for eliminating dependencies between the pixels of the target image;

performing, according to a frame difference between the first image and a first denoised image, temporal filtering on the pixels of the target image in parallel to obtain a second image, the first denoised image being a denoised image that corresponds to a preceding frame of the target image;

predicting first gain coefficients corresponding to pixels of the second image in a second denoised image according to second gain coefficients corresponding to the pixels of the target image in the first denoised image; and fusing the first image and the second image according to the first gain coefficients to obtain the second denoised image that corresponds to the target image.

2. The method according to claim 1, wherein the performing spatial filtering on the pixels of the target image in the video to be processed comprises:

acquiring, for the pixels of the target image in the video to be processed, initial pixel values of neighborhood pixels of each pixel; and performing the spatial filtering on the pixels according to the initial pixel values of the neighborhood pixels.

3. The method according to claim 1, wherein the performing spatial filtering on the pixels of the target image in the video to be processed comprises:

calling an image processing interface of a graphics processing unit;

acquiring the pixels of the target image in the video to be processed in parallel through the image processing interface; and filtering, through the image processing interface, the pixels acquired in parallel.

4. The method according to claim 1, wherein the performing, according to the frame difference between the first image and the first denoised image, temporal filtering on the pixels of the target image in parallel to obtain the second image comprises:

acquiring each pixel of the target image in parallel;

for each pixel of the target image:

determining a second variance of the pixel according to a first variance corresponding to a pixel in the first denoised image, the frame difference between the first image and the first denoised image, and a variance offset coefficient;

determining a first gain coefficient corresponding to the pixel according to the second variance, a first gain offset coefficient corresponding to the pixel, and a motion compensation coefficient; and determining a first pixel value of the pixel after the temporal filtering according to the first gain coefficient, an initial pixel value of the pixel, and a denoised pixel value corresponding to the pixel in the first denoised image; and obtaining the second image according to the first pixel value of each pixel of the target image after the temporal filtering.

5. The method according to claim 4, wherein the method further comprises:

determining the motion compensation coefficient according to the frame difference.

6. The method according to claim 4, wherein the method further comprises:

acquiring a second gain coefficient and a second gain offset coefficient corresponding to the pixel in the first denoised image; and determining the first gain offset coefficient corresponding to the pixel according to the second gain coefficient and the second gain offset coefficient.

7. The method according to claim 1, wherein the fusing the first image and the second image according to the first gain coefficients to obtain the second denoised image that corresponds to the target image and has undergone denoising comprises:

for each pixel of the second image, using a product of a difference between the first gain coefficient corresponding to the pixel and a preset value and a first pixel value of the pixel as a first fusion value;

using a product of the first gain coefficient corresponding to the pixel and a second pixel value of the pixel as a second fusion value, the second pixel value being a pixel value of the pixel after the spatial filtering; and summing the first fusion value and the second fusion value to obtain the denoised pixel value corresponding to the pixel.

8. The method according to claim 1, wherein the spatial filtering and the temporal filtering are respectively performed on brightness components of the pixels.

9. A video denoising apparatus, comprising a memory storing a computer program and a processor, wherein when executing the computer program, the processor is configured to:

perform spatial filtering on pixels of a target image in a video to be processed to obtain a first image, the spatial filtering being used for eliminating dependencies between the pixels of the target image;

perform, according to a frame difference between the first image and a first denoised image, temporal filtering on the pixels of the target image in parallel to obtain a second image, the first denoised image being a denoised image that corresponds to a preceding frame of the target image; and predict first gain coefficients corresponding to pixels of the second image in a second denoised image according to second gain coefficients corresponding to the pixels of the target image in the first denoised image; and fuse the first image and the second image according to the first gain coefficients to obtain the second denoised image that corresponds to the target image.

10. The apparatus according to claim 9, wherein the processor is further configured to, for the pixels of the target image in the video to be processed, acquire initial pixel values of neighborhood pixels of each pixel; and perform the spatial filtering on the pixels according to the initial pixel values of the neighborhood pixels.

11. The apparatus according to claim 10, wherein the processor is further configured to:

call an image processing interface of a graphics processing unit;

acquire the pixels of the target image in the video to be processed in parallel through the image processing interface; and filter, through the image processing interface, the pixels acquired in parallel.

12. The apparatus according to claim 9, wherein the processor is further configured to:

acquire each pixel of the target image in parallel;

for each pixel of the target image:

determine a second variance of the pixel according to a first variance corresponding to a pixel in the first denoised image, the frame difference between the first image and the first denoised image, and a variance offset coefficient;

determine a first gain coefficient corresponding to the pixel according to the second variance, a first gain offset coefficient corresponding to the pixel, and a motion compensation coefficient; and determine, according to the first gain coefficient, an initial pixel value of the pixel, and a denoised pixel value corresponding to the pixel in the first denoised image, a first pixel value of the pixel after the temporal filtering; and obtain the second image according to the first pixel value of each pixel of the target image after the temporal filtering.

13. The apparatus according to claim 12, wherein before the first gain coefficient corresponding to said each pixel is determined, the processor is further configured to:

determine the motion compensation coefficient according to the frame difference.

14. The apparatus according to claim 12, wherein before the first gain coefficient corresponding to said each pixel is determined, the processor is further configured to:

acquire a second gain coefficient and a second gain offset coefficient corresponding to the pixel in the first denoised image; and determine the first gain offset coefficient corresponding to the pixel according to the second gain coefficient and the second gain offset coefficient.

15. The apparatus according to claim 9, wherein the processor is further configured to, for each pixel of the second image:

use a product of a difference between the first gain coefficient corresponding to the pixel and a preset value and a first pixel value of the pixel as a first fusion value;

use a product of the first gain coefficient corresponding to the pixel and a second pixel value of the pixel as a second fusion value, the second pixel value being a pixel value of the pixel after the spatial filtering; and sum the first fusion value and the second fusion value to obtain the denoised pixel value corresponding to the pixel.

16. The apparatus according to claim 9, wherein the spatial filtering and the temporal filtering are respectively performed on brightness components of the pixels.

17. A non-transitory storage medium storing computer-readable instructions, the computer-readable instructions, when executed by one or more processors, causing the one or more processors to perform:

performing spatial filtering on pixels of a target image in a video to be processed to obtain a first image, the spatial filtering being used for eliminating dependencies between the pixels of the target image;

performing, according to a frame difference between the first image and a first denoised image, temporal filtering on the pixels of the target image in parallel to obtain a second image, the first denoised image being a denoised image that corresponds to a preceding frame of the target image;

predicting first gain coefficients corresponding to pixels of the second image in a second denoised image according to second gain coefficients corresponding to the pixels of the target image in the first denoised image; and fusing the first image and the second image according to the first gain coefficients to obtain the second denoised image that corresponds to the target image.

18. The storage medium according to claim 17, wherein the performing spatial filtering on the pixels of the target image in the video to be processed comprises:

acquiring, for the pixels of the target image in the video to be processed, initial pixel values of neighborhood pixels of each pixel; and performing the spatial filtering on the pixels according to the initial pixel values of the neighborhood pixels.

19. The storage medium according to claim 17, wherein the performing spatial filtering on the pixels of the target image in the video to be processed comprises:

calling an image processing interface of a graphics processing unit;

acquiring the pixels of the target image in the video to be processed in parallel through the image processing interface; and filtering, through the image processing interface, the pixels acquired in parallel.

20. The storage medium according to claim 17, wherein the performing, according to the frame difference between the first image and the first denoised image, temporal filtering on the pixels of the target image in parallel to obtain the second image comprises:

acquiring each pixel of the target image in parallel;

for each pixel of the target image:

determining a second variance of the pixel according to a first variance corresponding to a pixel in the first denoised image, the frame difference between the first image and the first denoised image, and a variance offset coefficient;

determining a first gain coefficient corresponding to the pixel according to the second variance, a first gain offset coefficient corresponding to the pixel, and a motion compensation coefficient; and determining a first pixel value of the pixel after the temporal filtering according to the first gain coefficient, an initial pixel value of the pixel, and a denoised pixel value corresponding to the pixel in the first denoised image; and obtaining the second image according to the first pixel value of each pixel of the target image after the temporal filtering.

* * * * *